N. B. TYLER.
Pigeon-Traps.
No. 139,836. Patented June 10, 1873.
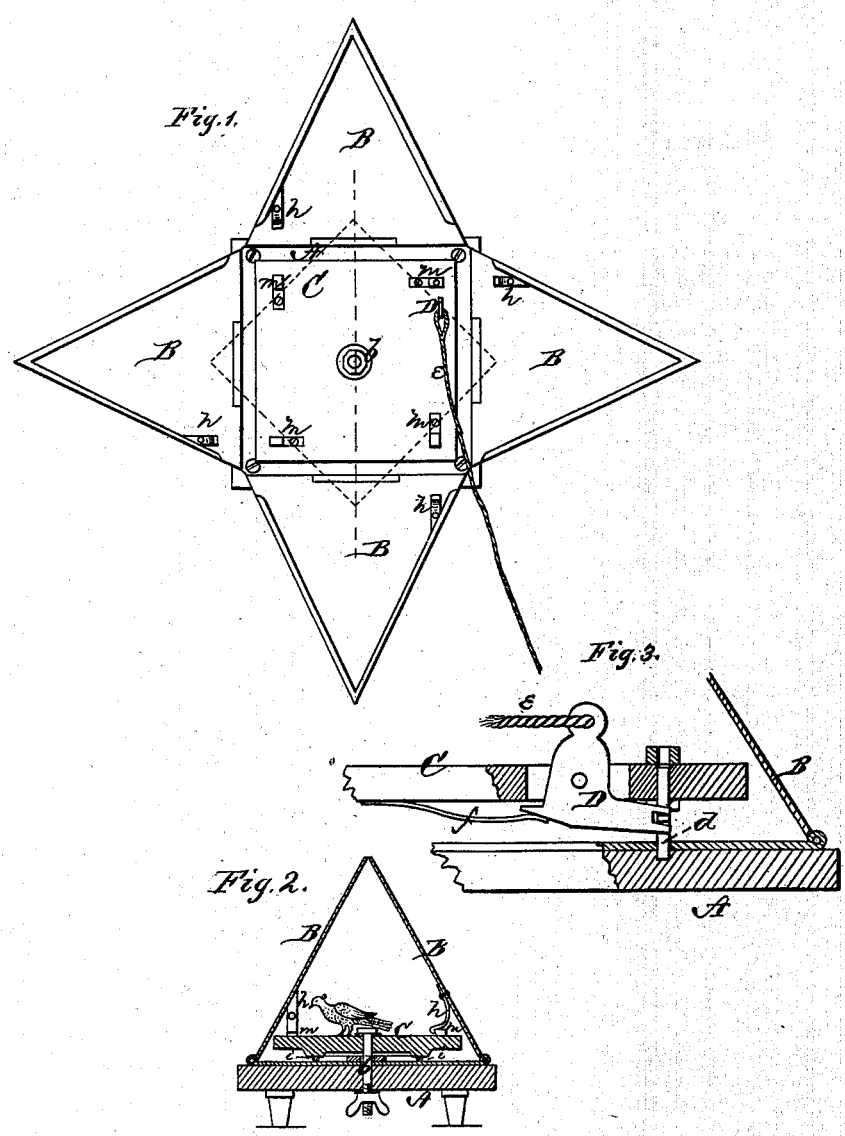
Witnesses:
Henry N. Miller
C. L. Evert
Inventor.
Nathan B. Tyler
per
Alexander Mason
Attorneys.

UNITED STATES PATENT OFFICE.

NATHAN B. TYLER, OF WARREN, OHIO.

IMPROVEMENT IN PIGEON-TRAPS.

Specification forming part of Letters Patent No. 139,836, dated June 10, 1873; application filed April 17, 1873.

*To all whom it may concern:*

Be it known that I, NATHAN B. TYLER, of Warren, in the county of Trumbull and in the State of Ohio, have invented certain new and useful Improvements in Pigeon-Traps; and do hereby declare that the following is a full, clear, and exact description thereof, reference being had to the accompanying drawings, and to the letters of reference marked thereon, making a part of this specification.

The nature of my invention consists in the construction and arrangement of a ground pigeon-trap, as will be hereinafter more fully set forth.

In order to enable others skilled in the art to which my invention appertains to make and use the same, I will now proceed to describe its construction and operation, referring to the annexed drawing, in which—

Figure 1 is a plan view of the trap open; Fig. 2 is a vertical section of the same closed; and Fig. 3 is an enlarged section of a latch used to fasten the revolving bottom.

A represents the main bottom of my trap, made in square form and provided with triangular hinged sides B B, so that when closed the trap has the appearance of a pyramid. C represents a revolving bottom of the same form, but somewhat smaller than the main bottom A, and turns on a center-bolt, $b$, it being supported upon rollers or balls $i\,i$ on the main bottom A. Through the revolving bottom C passes a bolt, $d$, into a hole in the main bottom A, to hold the revolving bottom in place when the trap is closed. This bolt is operated by an L-shaped lever, D, and spring $f$, the lever being pivoted in a slot on the revolving bottom, and its lower end forked to straddle a projection on the bolt, and the spring $f$ arranged in such a manner that the bolt $d$ will be thrown down, as shown in Fig. 3. A cord, $e$, is attached to the upper end of the lever D and passes out between two of the sides B B. On each side B is a spring-catch, $h$, which, when the trap is closed, catches on a piece, $m$, on the revolving bottom C.

When the cord $e$ is pulled the bolt $d$ is raised up and the bottom C revolves for a short distance, drawing the pieces $m\,m$ from under the spring-catches $h\,h$, and the corners of the bottom C instantaneously and simultaneously throw the sides B B down flat, as shown in Fig. 1. The revolving of the bottom C also frightens the pigeon so that it will fly immediately upon opening the trap.

Having thus fully described my invention, what I claim as new, and desire to secure by Letters Patent, is—

1. In combination with the main body of a trap, an auxiliary movable bottom which partially revolves, as and for the purposes herein set forth.

2. In combination with the two bottoms A and C, the sides B, connected and operated as and for the purposes set forth.

3. The lever D and pin $d$ for stationing the bottom C to the bottom A, as and for the purpose set forth.

In testimony that I claim the foregoing I have hereunto set my hand this 28th day of March, 1873.

NATHAN B. TYLER.

Witnesses:
GEO. P. HUNTER,
NATH. GUNLEFRIG, Sr.